(12) United States Patent
Matityahu et al.

(10) Patent No.: US 7,499,412 B2
(45) Date of Patent: Mar. 3, 2009

(54) ACTIVE PACKET CONTENT ANALYZER FOR COMMUNICATIONS NETWORK

(75) Inventors: Eldad Matityahu, Palo Alto, CA (US);
Robert E. Shaw, Los Gatos, CA (US);
Khalid Masodd, San Jose, CA (US);
Ali-Moosa R. Syed, Palo Alto, CA (US);
Siuman Hui, San Fransisco, CA (US);
Bhagyashri Bhagvat, San Jose, CA (US); Anis ur Rahman, Fremont, CA (US)

(73) Assignee: Net Optics, Inc., Santa Clara, CA (US)

( * ) Notice: Subject to any disclaimer, the term of this patent is extended or adjusted under 35 U.S.C. 154(b) by 661 days.

(21) Appl. No.: 11/174,248

(22) Filed: Jul. 1, 2005

(65) Prior Publication Data
US 2007/0002769 A1 Jan. 4, 2007

(51) Int. Cl.
*H04L 12/26* (2006.01)
(52) U.S. Cl. .................................... 370/255
(58) Field of Classification Search ................. 370/389, 370/392, 255, 252, 474, 475, 476, 471, 395.2, 370/395.21, 395.3, 428; 709/245, 246, 236, 709/223, 225
See application file for complete search history.

(56) References Cited
U.S. PATENT DOCUMENTS 5,648,965 A 7/1997 Thadani et al.
6,697,863 B1 * 2/2004 Egawa et al. ................ 709/226
6,882,654 B1 4/2005 Nelson
6,895,005 B1 * 5/2005 Malin et al. .................. 370/389
2003/0142666 A1 7/2003 Bonney et al.
2005/0018618 A1 * 1/2005 Mualem et al. ............. 370/252

OTHER PUBLICATIONS

"Written Opinion", Issue in PCT Application No.: PCT/US2006/25436; Mailing Date.: Mar. 4, 2008.
"International Search Report", Issue in PCT Application No.: PCT/US2006/25436; Mailing Date.: Mar. 4, 2008.
"International Preliminary Report on Patentability", Issued in PCT Application No.: PCT/US2006/25436; Mailing Date: May 22, 2008.

* cited by examiner

*Primary Examiner*—Chirag G Shah
*Assistant Examiner*—Nima Mahmoudzadeh
(74) *Attorney, Agent, or Firm*—IP Strategy Group, P.C.

(57) ABSTRACT

An active packet inspection device for a communications network, comprises a first terminal and a second terminal each adapted to couple the appliance in-line in the network and communicate data packets with network devices. A packet processor is coupled to the first terminal and second terminal and configured to normalize the data packets. A network search engine coupled to the packet processor and the memory, and configured to compare the data packets with the stored signatures, and when a match is found and other specified conditions are met, to perform an action identified in an associated rule. In one aspect, the network search engine includes a network search engine controller and a network search engine table including a memory configured to store a plurality of replicated signatures. Advantages of the invention include the ability to perform deep packet inspections actively on a communications network at high-speed.

15 Claims, 6 Drawing Sheets

| Pattern Entry | SIP | DIP | SP | DP | Misc | Signatures | Shifting |
|---|---|---|---|---|---|---|---|
| Length (bytes) | 4 | 4 | 2 | 2 | 1 | 43 | 16 |

| Session Entry | SIP | DIP | SP | DP | Misc | Unused |
|---|---|---|---|---|---|---|
| Length (bytes) | 4 | 4 | 2 | 2 | 1bit | |

FIGURE 3A

| Pattern RAM | Unused | ROM | LOM | Sig Length | Payload End | Payload Start | DOM |
|---|---|---|---|---|---|---|---|
| Length (bits) | 7 | 1 | 1 | 6 | 11 | 11 | 1 |

| Session RAM | Session Current State | RF | LF_Btes Count | Stored_LF Bytes | CLA | Session Output |
|---|---|---|---|---|---|---|
| Length (bits) | 5 | 1 | 6 | 43 bytes | 1 | 1 |

FIGURE 3B

| | Byte# | 13 | | | | | | | | 22 | | 52 | | | | | | 71 |
|---|---|---|---|---|---|---|---|---|---|---|---|---|---|---|---|---|---|---|
| Signature Copy #1 | | S | I | G | N | A | T | U | R | E | ... | A | P | H | A | N | T | ⊕⊕⊕ |
| Signature Copy #2 | | ⊕ | I | G | N | A | T | U | R | E | ... | E | P | H | A | N | T | ⊕⊕⊕ |
| Signature Copy #3 | | ⊕⊕ | I | G | N | A | T | U | R | | ... | L | E | P | H | A | N | T ⊕⊕ |
| Signature Copy #4 | | ⊕⊕⊕ | I | G | N | A | T | U | | | ... | E | L | E | P | H | A | N T ⊕ |
| Signature Copy #5 | | ⊕⊕⊕⊕ | S | I | G | N | A | T | | | ... | A | E | L | E | P | H | A N T |
| ... | | | | | | | | | | | | | | | | | | |
| Signature Copy #15 | | ⊕⊕⊕⊕⊕⊕⊕⊕⊕⊕ | | | | | | | | | ... | I | R | A | F | F | E | Z B R A E L E P H A N T ⊕ |
| Signature Copy #16 | | ⊕⊕⊕⊕⊕⊕⊕⊕⊕⊕⊕ | | | | | | | | | ... | G | I | R | A | F | F | E Z B R A E L E P H A N T |

Legend: byte don't care ⊕

FIGURE 3C

ACTIVE PACKET CONTENT ANALYZER FOR COMMUNICATIONS NETWORK

FIELD

The present invention relates to an active packet content analyzer for a communications network.

BACKGROUND

Telecommunications networks are important for providing global data and voice communication. Monitoring and analyzing the networks is important to ensure reliable operation, fault detection, timely mitigation of potentially malicious activities and more. Network taps are known for connecting to networks and providing a port to monitor the communication traffic on the network. Network monitors are known for providing information to other network elements.

Conventional network monitors are passive devices that collect information regarding internet protocol (IP) packets, source addresses, destination addresses, packet contents and more. The monitor then sends that information to other network elements to take action based on the information. For example, a firewall may block packets with a particular source or destination address.

One problem with convention network monitors is that they do not inspect the contents very precisely under high network traffic conditions and provide a mechanism to perform actions on packets or alert other devices through the network to perform specified functions on packets. Rather, conventional network monitors communicate with other network devices via separate communications channels. This is often a problem when other network devices are located far away from a monitor.

Consequently, there is need for an improved communications network monitor that can incorporate rules for taking local action on the network traffic, such as the active packet content analyzer described herein.

SUMMARY

The present invention provides an improved network traffic inspection that supports full-duplex monitoring and communication. The invention is an active response communications network appliance that inspects network traffic while also providing the network traffic to other monitors for different types of monitoring. They can transfer the network traffic data destined for other network devices.

An exemplary embodiment of an active packet content analyzer for a communications network comprises a specially designed first terminal and a specially designed second terminal each adapted to couple the analyzer in-line in the network and communicate data packets with network devices. A specially designed packet processor is coupled to the first terminal and second terminal and configured to normalize the data packets. A network search engine coupled to the packet processor and the memory, and configured to compare the data packets with the stored signatures, and when a match is found, to perform an action identified in an associated rule. In one aspect, the network search engine includes a network search engine controller and a network search engine table including a specially designed search engine memory controller which configures the memory to store a plurality of replicated signatures.

Advantages of the invention include the ability to actively inspect a communications network, in-bound and out-bound simultaneously, at high-speed and to identify and take actions on network traffic based on a set of rules.

DESCRIPTION OF THE DRAWINGS

The foregoing and other features, aspects, and advantages will become more apparent from the following detailed description when read in conjunction with the following drawings, wherein:

FIGS. 3A-C depict a network search engine table according to an embodiment of the invention.

DETAILED DESCRIPTION

The invention is described with reference to specific architectures and protocols. Those skilled in the art will recognize that the description is for illustration and to provide the best mode of practicing the invention. The description is not meant to be limiting. For example, reference is made to Ethernet Protocol but other protocols can be used in the invention. Likewise, reference is made to packets and cells, while other forms of data and addresses can be used in the invention.

The invention is an active network inspection appliance that can be configured as an intrusion detection and prevention device, which acts based upon two critical items: protocol rules and string matching rules. The invention can detect unauthorized attempts to compromise the security of IP networks, unauthorized transfer of contents and blocks specific suspicious traffic in an IP network. The exemplary embodiment runs at 1 G Ethernet traffic at sustained full rate for both inbound and outbound direction, simultaneously. Also, the Network Search Engine (NSE) checks each bit of the protocol header and each bit of every data packet for any match within signature entries. The invention employs a signature shifting scheme inside the NSE to keep up with a 2 G search rate and assure match can happen anywhere within a packet or two consecutive packets.

A. Architecture

Figure 1:
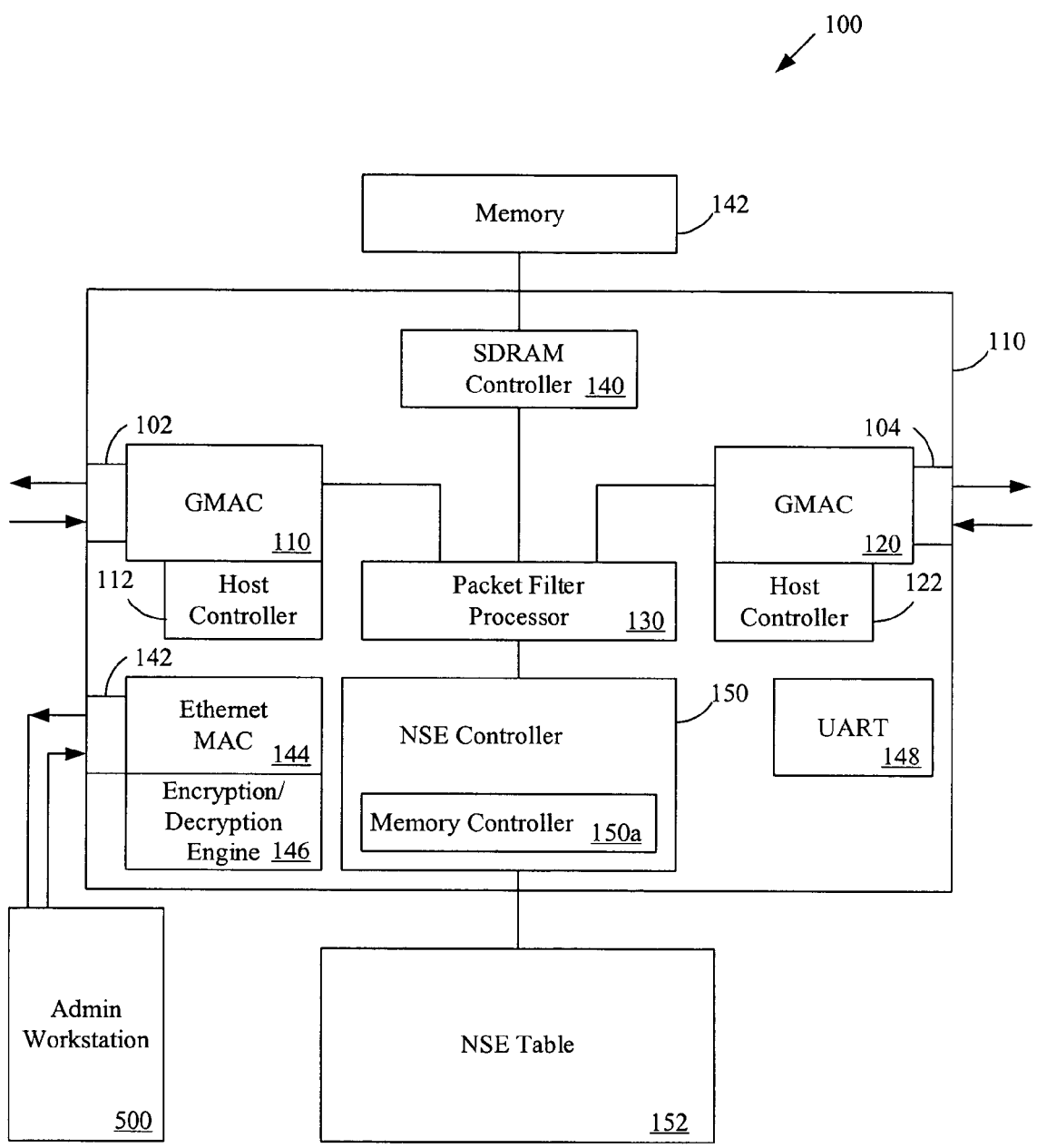
FIG. 1 depicts an active inspection appliance according to an embodiment of the invention.

FIG. 1 depicts an active inspection appliance 100 according to an embodiment of the invention. The exemplary inspection appliance comprises a first terminal 102 and a second terminal 104 each adapted to couple the appliance in-line in the network and communicate data packets with network devices. In the exemplary embodiment, the terminals are standard RJ45 jacks that permit other network devices to be coupled to the terminals with standard CAT5 cable. Such network devices include routers, switches or other types of network devices. The network traffic flows into one of the terminals, is evaluated by the appliance 100 and then an action may be performed on the data packets that make up the network traffic. Presuming that the packet is clean, the traffic is forwarded to the other terminal to continue on its way to its destination. If a packet match is found, then an action may be taken on the network traffic.

Specially designed Gigabit media access controllers (GMAC) 110 and 120 are coupled to the respective terminals and are configured to communicate over the network. In the exemplary embodiment, the protocols are: IP, TCP/IP, FTP, UDP and other application protocols running on gigabit Ethernet, but the invention can also be used with other protocols, for example, 10/100 Ethernet protocol or others as known in the art.

A packet processor 130 is coupled to the first terminal via the specially designed GMAC 110 and to the second terminal via the specially designed GMAC 120. The packet processor is organized around the layers of the protocol stack present in the Ethernet and TCP/IP protocol definitions. The packet processor imposes order on the packet data by overlaying packet header mask on the raw Ethernet frame. A hardware decoding routine obtains the Source and Destination IP addresses, port numbers and flag information from the IP and TCP/UDP/ICMP headers and sets pointers to the beginning of the payload. The packet processor is configured to normalize the data packets. This is performed by masking a portion of the packets and providing the unmasked portion of the packets for evaluation. The unmasked portion of a packet is a normalized packet. The packet processor includes a content addressable memory (CAM) controller that communicates with a network search engine to perform a packet lookup.

A network search engine (NSE) 150-152 is coupled to the packet processor. An NSE controller 150 includes memory controller 150a, and an NSE table 152 is coupled to the NSE controller. The packet processor is configured to compare the data packets from the packet processor with stored packets, and when a match is found, to identify an action to be performed on the data packet, as described below. Once the action is identified, the packet processor performs the identified action on the data packet.

In one aspect, the invention includes a management port 144 for a system administrator to connect an administrative workstation. The management port is a 'Secured Management Port' that deploys SSL security Protocol, AES-256/512/1024, which is implemented using encryption/decryption engine 146. It is also anticipated that other encryption and decryption techniques, and improvements thereof, can be implemented in the invention. This connection permits the system administrator to upload the NSE table signatures, download the log files, allow other standard report viewing tools to view and analyze captured logs and data and perform other administrator and analyzer functions. The port includes a terminal 142 and interface controller 144, for example, a 10/100 Ethernet port. In another aspect of the invention, an administrator can communicate with the invention via the terminals 102, 104 by addressing the invention over the communications network.

B. Method of Operation

Figure 2A:
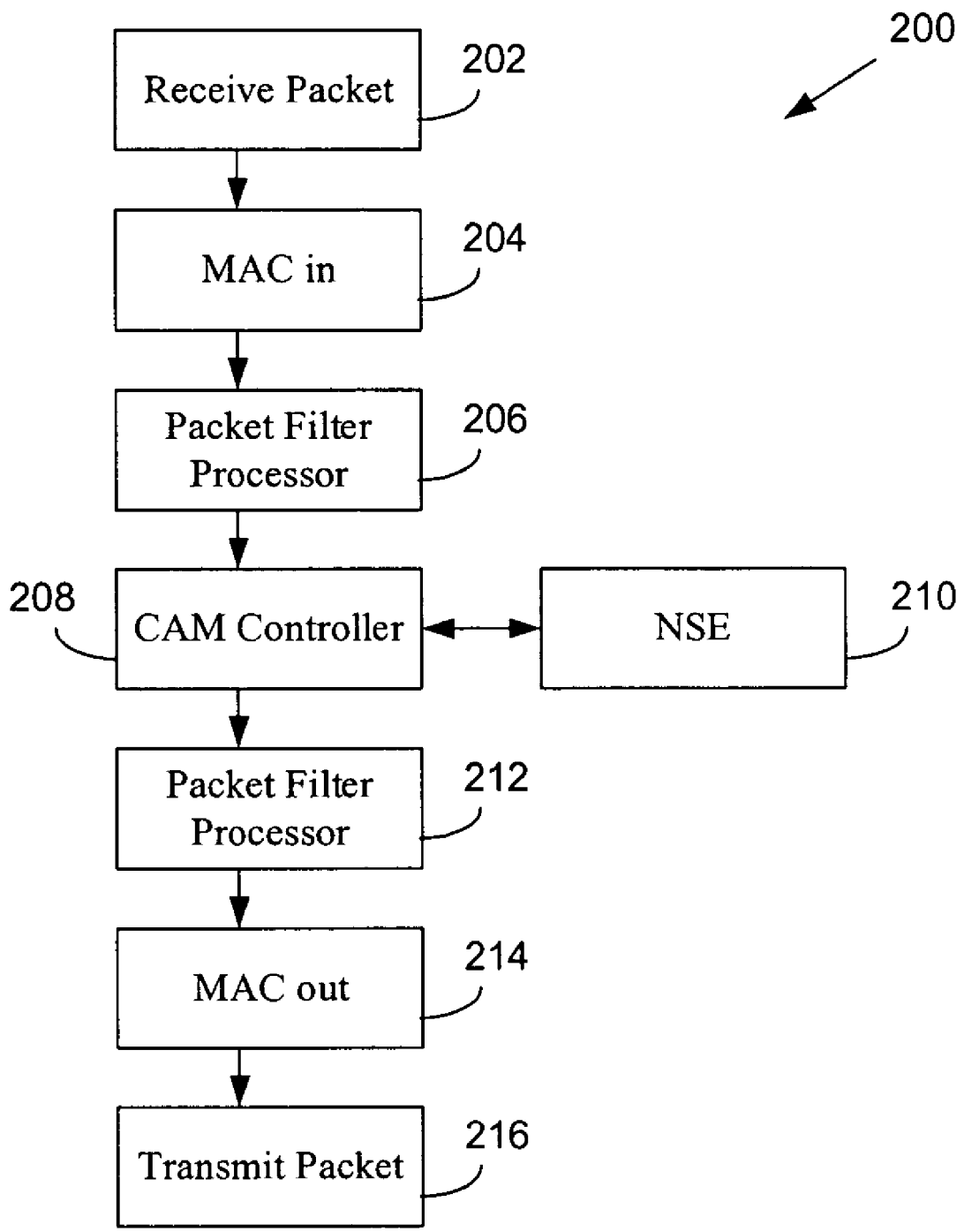
FIGS. 2A-B depict flowcharts showing steps for performing methods according to embodiments of the invention.

FIG. 2A depicts a flowchart 200 showing steps for performing a method according to an embodiment of the invention. In steps 202, 204, the analyzer receives a packet from a network device via one of the terminals, e.g. 102, and the corresponding GMAC, e.g. 110, using the applicable network protocol. In step 206, packet filter processor 130 normalizes the packet for processing. In step 208, the CAM controller in the packet processor communicates with the NSE, and step 210 determines whether a match is made with the contents of the NSE table, and if so, returns an action to be performed on the packet, which is describe in FIG. 2B. In step 212, the packet processor performs an action on the packet, which may include simply forwarding the packet to it's destination as described in FIG. 2B. In steps 214, 216, the other GMAC, e.g. 120, sends out the packet using the appropriate network protocol via the other physical terminal, e.g. 104.

Figure 2B:
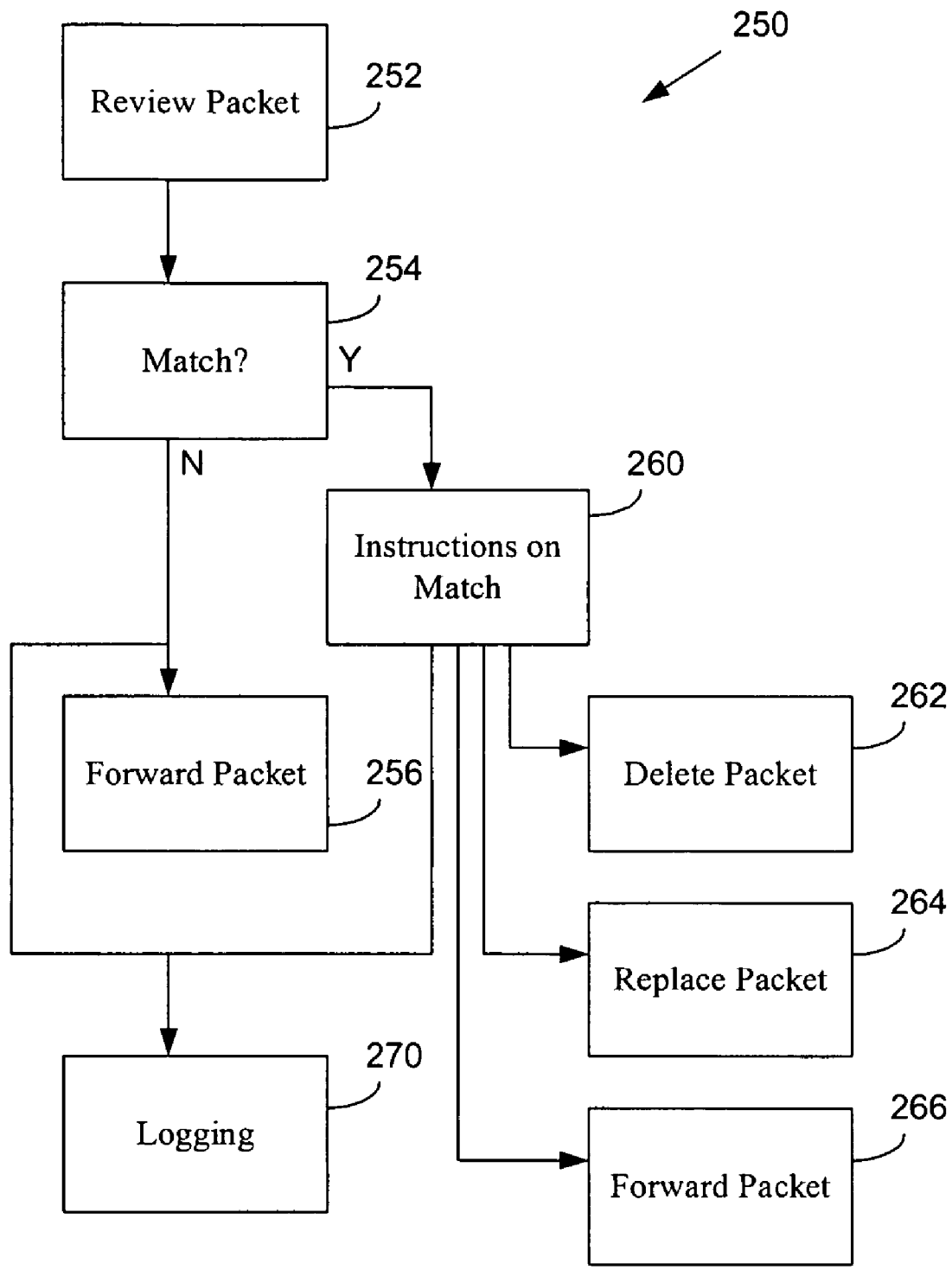

FIG. 2B depicts a flowchart 250 showing steps for performing a method according to an embodiment of the invention. This flowchart is applicable to steps 206 through 212 described with reference to FIG. 2A. In step 252, the packet processor reviews the packet and in step 254, the CAM controller and NSE determines whether a match occurs. If no match occurs, then step 256 forwards the packet to its destination. If a match occurs, then step 260 determines what action to take on the packet, for example, to delete the packet in step 262, to replace the packet in step 264 or to forward the packet in step 266. Implementation of these options is described below with reference to the NSE and the administrative workstation. In any event, the packet may be logged in step 270 to keep a history of the network traffic and actions taken on the packets.

C. NSE Controller and Table

In one aspect, the network search engine includes a network search engine controller, network search engine memory controller and a network search engine table including a memory configured to store packet data.

The match detection is implemented in the CAM. The CAM contains the rules that the user has uploaded to the invention. The rules are stored in the following format: Source IP Address, Source Port Number, Destination IP Address, Destination Port Number, Flags and Pattern to be matched. Each CAM entry contains six fields. The CAM is loaded during initialization by reading the rule set. In the match word of the CAM, the first five fields are obtained from the packet headers from the packet processor, and the pattern is read from the payload, as the first 56 Bytes of the payload, i.e. Byte 0 through Byte 55. Every time a comparison is made and if no match is found, the first four fields in the match word remain the same and the last field i.e. the pattern now contains Byte 1 through 56 of the payload.

The exemplary embodiment is targeted at running 1 G Ethernet traffic at full rate for both inbound and outbound direction simultaneously. The Network Search Engine (NSE) checks each bit of every packet for any match within signature entries. The invention employs a signature shifting scheme inside the NSE to accelerate the match time by 1600 percent thus decreasing the latency through the appliance and to keep up with a 2 G search rate and assure match can happen anywhere within the packet.

FIGS. 3A-C depict a network search engine table according to an embodiment of the invention. The NSE controller and NSE table provide the following functions: (a) storing signatures and session table; (b) conducting parallel searches for session table; (d) conducting parallel searches for IP address, port, Protocol-Type and/or flag with each signature; and (e) conducting parallel searches in payload with each signature.

Features of the NSE include the following: (a) full ternary content addressable memory (TCAM); (b) a plurality of different configurations, e.g., 64K×72, 32K×144 or 16K×288, or 8K×576 bits, and up with 480 unique rules, where each entry is 576-bit wide, and support 1024 sessions at a time, where each session entry is 144-bit wide; (c) a local mask bit associated with each NSE bit; (d) internal clock rates@62.5 MHz and 2×I/O clock rate @125 MHz; (e) a 16-bit Instruction Request Bus, 72-bit Request Data Bus, 16-bit Response Address Bus and other Response signals; (f) 16 segments individually configurable, where the first fifteen segments are configured as 512×576 bit and used as signature entries, and the last segment is configured as 2K×144 bit and use as session entries; (g) burst write for high speed table updates; and (h) Multi-match of the signatures.

In an exemplary embodiment, the total array size of the NSE table is 72 bytes wide by 8 K deep. Each 72 byte wide location holds one rule entry that includes 13 header bytes, 43 payload signature bytes, 16 payload_shift bytes and miscellaneous overhead bytes. The header information includes contents like source IP, source port, destination IP and destination port. The payload signature could be anywhere from 1 byte to 43 bytes.

FIG. 3C shows that each signature entry is stored at 16 consecutive locations with each subsequent entry shifted right by one byte. Appropriate MASK bits are set to indicate 'Don't care' bits. At each time interval, the invention presents 13 bytes header and 43 bytes payload to NSE. At the next time interval, the invention shifts in new 16 payload bytes at the end of the first payload and presents to the NSE. By shifting 16 bytes for each NSE search, it only takes 1/16 time to complete searching the whole packet. This technique allows 16 times faster searches of the whole payload and supports the goal to search packets at 1 G bit rate in both directions simultaneously.

D. Logger

A logging subsystem maintains a Log Table, which is a subset of the session table. The Log Table contains all the flagged entries from the session table. Depending on the memory availability, the Log Table contains the entries for the previous rule set.

The invention runs an application called logserver, which is for receiving logs and alerts from the network analyzer. The logserver is a DOS prompt based program, which assumes the IP address of a host PC. The user can specify the logdump filename and the alertdump filename. Logdump is the file which stores the content of the log sent from the invention and it is in binary format. Similarly, alertdump is the file to store the alert content. The default names are logdump.bin and alertdump.bin. The typical usage is as a command-line interface, logserver portnum logdumpfilename alertdumpfilename, for example, logserver 1902 log_Lasso.bin alert_Lasso.bin.

The logserver fields include the following.

Message: The message contains the information of message for the matching rule. (Same as session 5.1.2)

Rule Id: This contains the rule id for the matching rule. (Same as session 5.1.1)

Bank Id: This contains the bank of current use. The invention has two banks: bank 0 and bank 1. Each bank can contain different rules.

Source Port: This contains the source port information of where the matching packet is coming from.

Destination Port: This contains the destination port information of where the matching packet is going to.

Source IP: This contains the source IP of where the matching packet is coming from.

Destination IP: This contains the destination IP of where the matching packet is going to.

Time: This contains the actual precise time when the matching event inspected by the invention occurred. The smallest interval is 40 ns.

Rule File: This contains the name and path of the rule file.

Monitor Name: This contains the monitor name, which is useful for a multiple management console monitor system.

Data Count: This is the size of the matching packet.

LOG Count: This contains how many logs have been received since the application started.

Writing LOG SIZE: This is the size of the total size, including the actual matching packet and other information.

TOTAL: This contains how many logs and alerts received since the application started.

E. Administrative Workstation

Figure 4:
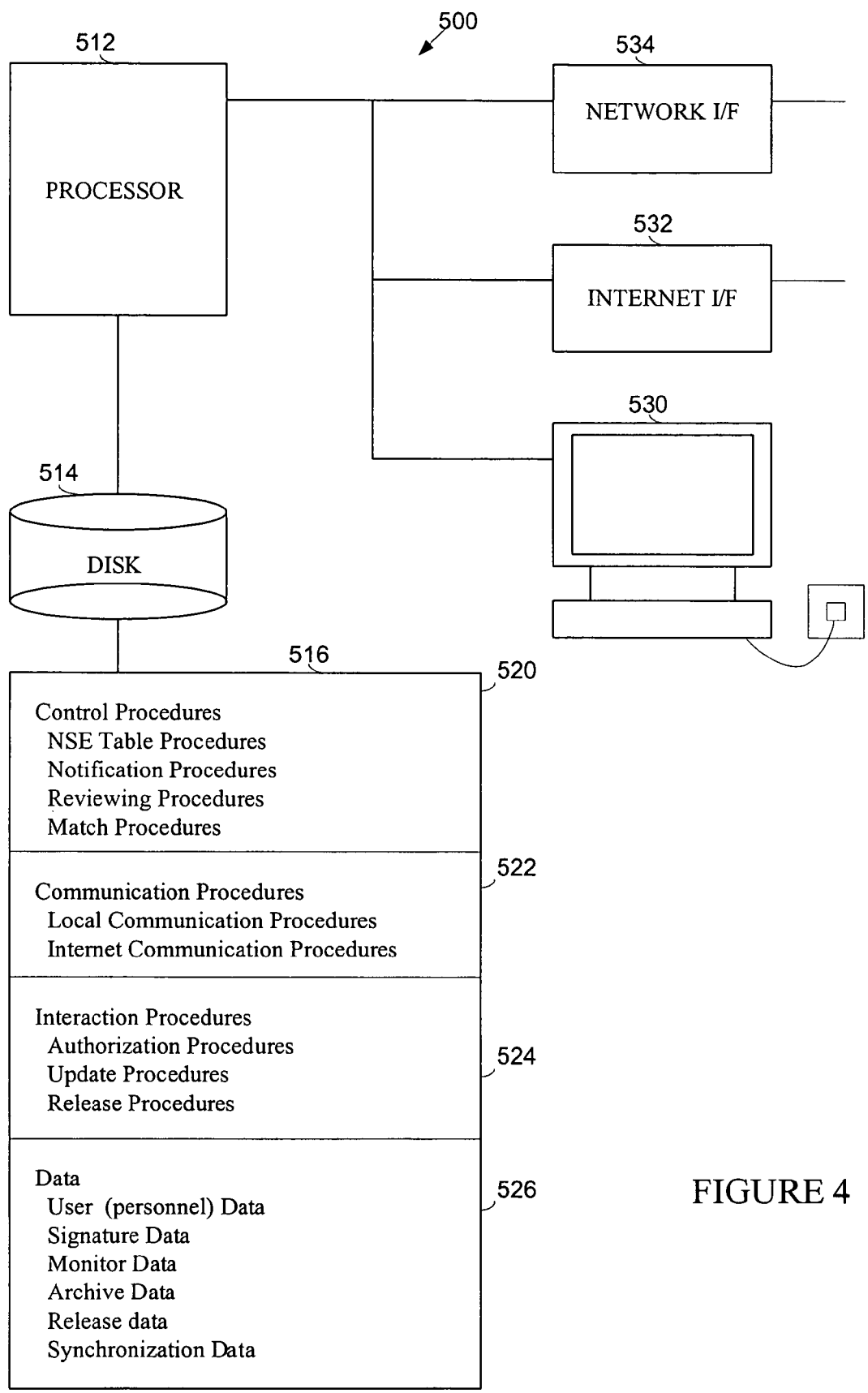
FIG. 4 depicts an administrative workstation for controlling the active packet content analyzer

FIG. 4 depicts an administrative computer for controlling the active deep packet content analyzer according to an embodiment of the invention. The invention provides a graphical user interface (GUI) for a user, e.g. a system administrator, to control the invention. Users can control different aspects of the invention from the GUI, including uploading rule files, setting various parameters and gathering network traffic statistics. In one aspect, a user can create a new rule setting and apply the setting to the invention over a Secured Ethernet interface, a terminal interface or other appropriate interface. The rule includes information for the invention to populate the NSE table with appropriate signature information to search for a match with the network traffic. The rule also includes information regarding the disposition of network traffic that matches the signature, for example, to delete the packet, replace the packet, or forward the packet to its desired destination. By providing for the uploading of rules, the invention provides flexible functionality over the Secured Ethernet network that is not provided in convention systems.

Features include the following.

Protocol: This specifies the Transport Layer Protocol that the incoming packet should contain in order to match this rule. The protocols that are considered are TCP, UDP and ICMP. For any other protocols, check 'Don't Care'.

Source IP: The fields Source IP, Destination IP, Source Port, Destination Port, Flags and Signature are the main fields that form a rule. The Source IP field contains the Source IP Address that should be matched against the Source IP address in the packet.

Range: Using this field a range of IP addresses can be specified. Basically, this field will contain the subnet mask. E.g. a source IP address of 192.178.16.1 with a range field of 8 will mean, any packet that has a source IP address of 192.178.16.xxx should match against these rules Source IP address. The range field indicates the number of low order bits that are considered 'Don't Care' that include the range of those bits e.g. a value of 4 means a range from 0-15 would be searched for a match.

Don't Care: If this field is set to 'Yes', that means the Source IP address in the packet should not be considered for matching against this rule. This field overrides the Source IP field, which means, if a valid IP address is entered in the 'Source IP' field but if the 'Don't Care' field is set to 'Yes', then the Source IP address is not considered for matching against this rule.

Source Port: The Source Port field contains the Source Port Number that should be matched against the Source Port Number in the packet.

Range: The Range for port numbers can consider only ranges that are powers of 2. e.g. 2, 4, 8, 16 etc. The meaning of the Don't Care field is the same as that in the Source IP field.

Destination IP: The Destination IP field contains the Destination IP Address that should be matched against the Destination IP address in the packet. The meaning of the Range and Don't Care fields is the same as those in the Source IP field.

Destination Port: The Destination Port field contains the Destination Port Number that should be matched against the Destination Port Number in the packet. The meaning of the Range field is the same as that in the Source Port field, and that of the Don't Care field is the same as that in the Source IP field.

Alert Packet on Match: This states if an alert should be sent upon finding a packet that matches this rule. The actual alert packet IP is set in Section 5.4.1

Drop Packet on Match: This states if the packet should be dropped upon finding a match with a rule. This is a very useful feature that enables dropping (or sanitizing) the packet as soon as a match is found and not allowing it to go to the host thus preventing an intrusion. This feature is a novel aspect that makes the invention an Intrusion Prevention System.

Log Packet on Match: This states if the packet should be logged upon finding a packet that matches this rule. If the user expects too many packets might match this particular rule, it might be a good idea to turn off logging for this rule to avoid overflowing of logs.

Replace Packet On Match: This states if the packet should be replaced by zeroes upon finding a match with a rule. This is a feature that targets email application upon TCP connection. Since TCP is a connection orientated protocol, dropping packet will cause TCP retransmission and application (like Outlook) retry continuously. By replacing the packet with zeroes, it will allow the TCP to complete its session. At the application level (Outlook), it will receive an empty message.

Payload Pattern: This specifies the actual HEX or ASCII pattern (string) that needs to be present in the packet for it to match against this rule. This field can be as long as 43 bytes in ASCII or 86 nibbles in HEX.

Don't Care: If this field is set to 'Yes', that means the payload pattern in the packet should not be considered for matching against this rule. This field overrides the payload field.

Sent Alert to IP: This is the IP address (of the Alert server) to which live alert will be transmitted if a packet matching this rule is encountered. This is usually the IP address of the network administrator who is responsible for analyzing the alerts generated by the invention. Since, the invention is capable of sending the alerts to the specified IP address; it can be monitored from anywhere as far as it has a valid IP address. The network administrator does not have to be physically located at the same site as that of the invention. The network administrator can view and analyze reports, logs and can write applications to generate other kinds of alerts/alarms when the invention sends alerts (e.g. any kind of audio-visual alarms or electronic mails or pager beeps etc)

Port: This is the Port number at which the alert server will be running, and so the live alert will be transmitted to this port number if a packet matching this rule is encountered. This is the port number of the network administrator's computer that will be receiving the alerts and logs. The applications to receive the alerts/logs will be tied to this port number.

Payload Offset: This field contains the offset in the transport layer payload from which the pattern should be looked for. If the pattern lies before this specified offset, it is not considered as a match.

Payload End: This field contains the last byte in the transport layer payload up to which the pattern should be looked for. If the pattern lies after this specified byte position, it is not considered as a match.

Hex: If this box is checked, it means the Pattern that is entered in the 'payload pattern' field is a Hex pattern.

Check Case: If this box is checked, it means the pattern entered in the 'payload pattern' field is case sensitive.

TCP Flags: If the protocol specified in the rule is TCP, the invention can check for any TCP flags that are set in the packet. This is an additional check to be done to match a packet against a rule. Out of the following TCP flags, check any flag that needs to be set in the packet for matching against this rule. The flags that can be checked for are all the TCP flags, i.e. SYN, FIN, RST, URG, PSH and ACK.

ICMP Fields: If the protocol specified in the rule is ICMP, the invention can check for specific ICMP Type and Code values in the packet. This is an additional check to be done to match a packet against a rule. ICMP Type values of 0 through 40 and ICMP Code values of 0 through 15 can be checked. If the packet needs to contain any non-zero ICMP code to match against this rule, check non-Zero for ICMP code. In that case, if the packet contains any ICMP code other than zero, it will match against this rule.

F. Conclusion

Advantages of the invention include the ability to actively perform deep packet content inspection on a communications network at high-speed, and to identify and take actions on network traffic based on a set of rules.

Having disclosed exemplary embodiments and the best mode, modifications and variations may be made to the disclosed embodiments while remaining within the subject and spirit of the invention as defined by the following claims.

The invention claimed is:

1. An active packet content analyzer for a communications network, the active packet content analyzer comprising:
   a first terminal and a second terminal each couple the analyzer in-line in the network and communicate data packets with network devices;
   a packet processor coupled to the first terminal and second terminal and configured to normalize the data packets; and
   a network search engine coupled to the packet processor and the memory, and configured to compare the data packets with the stored signatures, and when a match is found, to perform an action identified in an associated rule,
   wherein the network search engine includes multiple entries for each stored signature, where each signature is replicated a number of times and staggered with respect to one another, and
   search time is reduced in proportion to the number of replicated stored signatures.

2. The active packet content analyzer of claim 1, wherein: the network search engine includes 16 entries for each stored signature, where each signature is replicated 16 times and staggered with respect to one another.

3. The active packet content analyzer of claim 1, wherein: the network search engine includes a network search engine controller and a network search engine table including a memory configured to store the signatures.

4. The active packet content analyzer of claim 3, wherein: the network search engine table includes 16 entries for each stored signature, where each signature is replicated 16 times and staggered with respect to one another.

5. The active packet content analyzer of claim 3, wherein: the actions taken by the analyzer based on a signature match and associated rule include at least one of alert on match, drop on match, log on match and replace on match.

6. The active packet content analyzer of claim 1, wherein: the actions taken by the analyzer based on a signature match and associated rule include at least one of alert on match, drop on match, log on match and replace on match.

7. The active packet content analyzer of claim 1, wherein: the actions taken by the deep packet content analyzer based on a signature match other conditions match, and associated rule include at least one of alert on match, drop on match, log on match and replace on match.

8. The active packet content analyzer of claim 1, further comprising:
   a user interface to an administrative computer,
   wherein the administrative computer is configured to communicate with the network search engine to upload rules to the network search engine.

9. A method of monitoring a communications network using an active packet content analyzer coupled in-line in the network, the active deep packet content analyzer including a packet processor and network search engine, the method comprising the steps of:

receiving data packets;

normalizing the data packets;

comparing the data packets with the stored signatures;

when a match is found, performing an action identified in an associated rule; and storing multiple entries for each stored signature, where each signature is replicated a number of times and staggered with respect to one another, wherein search time is reduced in proportion to the number of replicated stored signatures.

10. The method of claim 9 wherein:

the network search engine includes 16 entries for each stored signature, where each signature is replicated 16 times and staggered with respect to one another.

11. The method of claim 9, wherein the network search engine includes a network search engine controller and a network search engine table.

12. The method of claim 11, wherein:

the network search engine table includes 16 entries for each stored signature, where each signature is replicated 16 times and staggered with respect to one another.

13. The method of claim 11 wherein:

the step of performing an action identified in an associated rule includes at least one of alert on match, drop on match, log on match and replace on match.

14. The method of claim 9, wherein:

the step of performing an action identified in an associated rule includes at least one of alert on match, drop on match, log on match and replace on match.

15. The method of claim 9, further comprising the step of:

communicating with the network search engine to upload rules to the network search engine.

* * * * *